United States Patent
Ueyoko

(10) Patent No.: US 9,272,577 B2
(45) Date of Patent: Mar. 1, 2016

(54) AIRCRAFT RADIAL TIRE

(75) Inventor: Kiyoshi Ueyoko, Copley, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 33 days.

(21) Appl. No.: 13/469,510

(22) Filed: May 11, 2012

(65) Prior Publication Data

US 2013/0118666 A1  May 16, 2013

Related U.S. Application Data

(60) Provisional application No. 61/496,338, filed on Jun. 13, 2011.

(51) Int. Cl.

| B60C 9/22 | (2006.01) |
|---|---|
| B60C 9/18 | (2006.01) |
| B60C 9/28 | (2006.01) |
| B60C 15/024 | (2006.01) |
| B60C 15/06 | (2006.01) |
| B60C 3/04 | (2006.01) |

(52) U.S. Cl.
CPC ... B60C 9/18 (2013.01); B60C 3/04 (2013.01); B60C 9/2204 (2013.04); B60C 9/28 (2013.01); B60C 15/024 (2013.01); B60C 15/06 (2013.01); B60C 2015/0614 (2013.04); B60C 2200/02 (2013.04); Y10T 152/10765 (2015.01)

(58) Field of Classification Search
CPC ............ B60C 9/18; B60C 9/22; B60C 9/2204
USPC ......... 152/526, 531, 533, 536, 538, 539, 543, 152/544, 546
See application file for complete search history.

(56) References Cited

U.S. PATENT DOCUMENTS

| 4,813,467 A | * | 3/1989 | Hinkel et al. ................. 152/454 |
| 5,188,686 A | * | 2/1993 | Ueyoko et al. ............... 152/454 |

(Continued)

FOREIGN PATENT DOCUMENTS

| EP | 0371754 A2 | 6/1990 |
| EP | 0463273 | * 1/1992 |

(Continued)

OTHER PUBLICATIONS

Data Sheet Terminology. Bridgestone. no date. [online] [retrieved on Sep. 24, 2014]. Retrieved from the Internet <URL: http://www.bridgestone.com/products/speciality_tires/aircraft/products/applications/pdf/data_sheet_terminology.pdf>.*

(Continued)

*Primary Examiner* — Justin Fischer
*Assistant Examiner* — Robert Dye
(74) *Attorney, Agent, or Firm* — June E. Rickey

(57) ABSTRACT

A pneumatic radial aircraft tire is described having a B/A ranging between 60-70%. The tire may further optionally include a tire bead portion having a Ra/Fr1 relationship which ranges from about 1 to about 2.1. The tire may further optionally include a SW/TS ratio which ranges from about 0.1 to about 0.5, wherein SW is the chafer gauge at area A, TS is the total sidewall rubber gauge at area A, wherein A is defined as the region in the sidewall that has a lower radial endpoint defined by the point of contact between the flange and the tire at inflated, unloaded condition, and an upper radial endpoint $A_H$ defined by the tire wheel flange point of contact when the tire is at inflated, and at 200% rated load.

14 Claims, 4 Drawing Sheets

(56) References Cited

U.S. PATENT DOCUMENTS

| | | | |
|---|---|---|---|
| 5,285,835 A * | 2/1994 | Ueyoko et al. | 152/209.14 |
| 5,476,129 A * | 12/1995 | Shoyama | 152/454 |
| 6,622,766 B1 * | 9/2003 | Baldwin, Jr. | 152/540 |
| 7,712,499 B2 * | 5/2010 | Yano et al. | 152/527 |
| 8,376,011 B2 * | 2/2013 | Ueyoko et al. | 152/539 |
| 2005/0252593 A1 * | 11/2005 | Monnerie | 152/454 |
| 2008/0105352 A1 | 5/2008 | Ueyoko et al. | |
| 2009/0308518 A1 | 12/2009 | Ueyoko | |
| 2010/0147434 A1 | 6/2010 | Ueyoko et al. | |
| 2010/0276053 A1 * | 11/2010 | Yano | 152/535 |
| 2011/0303336 A1 * | 12/2011 | Ueyoko | 152/526 |
| 2012/0043000 A1 * | 2/2012 | Ueyoko et al. | 152/527 |

FOREIGN PATENT DOCUMENTS

| | | |
|---|---|---|
| EP | 540303 A1 | 5/1993 |
| EP | 1449680 | 8/2004 |
| EP | 1518666 A2 | 3/2005 |
| EP | 2196327 A2 | 6/2010 |
| EP | 2420396 | 2/2012 |
| JP | 2008273471 A | 11/2008 |
| JP | WO2009063759 * | 5/2009 |

OTHER PUBLICATIONS

Aircraft Tire Data Book. The Goodyear Tire & Rubber Company. Oct. 2002. [online] [retrieved on Mar. 19, 2015]. Retrieved from the Internet <URL: http://www.goodyearaviation.com/resources/pdf/db_airdatabook.pdf>.*

Great Britain Search Report.

French Search Report dated Mar. 11, 2013.

Chinese Search Report.

* cited by examiner

ND TIRE

This Application claims the benefit of and incorporates by reference U.S. Provisional Application No. 61/496,338 filed Jun. 13, 2011.

This invention relates in general to radial ply tires, and more particularly to tires subjected to very heavy loads, high pressures and high speed.

BACKGROUND OF THE INVENTION

Aircraft tires are subject to extreme operating conditions due to the heavy load per tire coupled with the high speed of the aircraft. Because of the heavy loading, the tires are subject to much greater deflection than passenger or truck tires.

Aircraft tires have two common constructions: bias and radial. Over 70% of aircraft tires are bias, which means they have a casing made of layers of alternate layers of ply that are at alternate angles substantially less than 90 degrees relative to the center line of the tread. However, radial tires are becoming more common as airframe manufacturers seek lighter weight. Radial tires are like passenger tires in that they have the ply oriented at substantially 90 degrees relative to the tread centerline. Aircraft tires come in a range of sizes, however the H-type size range has historically been a bias tire. Due to the modern trend, it is desired that radial aircraft tires are available in the H-type size. This has not been possible in the past because they have more deflection in the sidewall due to bending under loading. As a result, radial tires may have an increased heat generation and mechanical fatigue in the bead area of the tire. There may also be problems of bead cracking and scuffing in the bead region, as well as rubber deformation under the bead core.

Thus an improved radial tire with increased durability and bending resistance is desired.

SUMMARY OF THE INVENTION

A first aspect of the invention is a pneumatic aircraft tire having a radial carcass, tread, a crown reinforcement including one or more belt layers or strips reinforced by cords oriented relative to the circumferential direction at an angle of between 0° and 45° with respect to the equatorial plane of the tire. The B/W of the tire ranges between 60-70%, wherein B is the width of the tire between the wheel flange, and W is the inflated tire width under rated pressure.

A second aspect of the invention includes a pneumatic aircraft tire having a radial carcass, tread, a crown reinforcement having one or more belt layers or strips reinforced by cords oriented relative to the circumferential direction at an angle of between 0° and 45° with respect to the equatorial plane of the tire. The tire includes a B/W ratio which ranges from about 0.6 to about 0.7 (60-70%), wherein B is the width of the tire between the wheel flange, and W is the inflated tire width under rated pressure. The tire may further optionally include a tire bead portion having a Ra/Fr1 relationship which ranges from about 0.6 to about 2.1, wherein: Ra is the tire radius of the bead sidewall at uninflated and in a new and unused condition, and Fr1 is the wheel flange maximum radius. The tire may further optionally include a SW/TS ratio which ranges from about 0.1 to about 0.5, wherein SW is the chafer gauge at area A, TS is the total sidewall rubber gauge at area $A_H$, wherein A is defined as the region in the sidewall that has a lower radial endpoint defined by the point of contact between the flange and the tire at inflated, unloaded condition, and an upper radial endpoint $A_H$ defined by the tire wheel flange point of contact when the tire is at inflated, and at 200% rated load.

DEFINITIONS

"Apex" means a non-reinforced elastomer positioned radially above a bead core.

"Aspect ratio" of the tire means the ratio of its section height to its section width multiplied by 100% for expression as percentage.

"Axial" and "axially" means lines or directions that are parallel to the axis of rotation of the tire.

"Bead" means that part of the tire comprising an annular tensile member wrapped by, or otherwise attached to ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 5° to 45° with respect to the equatorial plane of the tire.

"Bias ply tire" means a tire having a carcass with reinforcing cords in the carcass ply extending diagonally across the tire from bead core to bead core at about a 25°-65° angle with respect to the equatorial plane of the tire. Cords run at opposite angles in alternate layers.

"Carcass" means the tire structure apart from the belt structure tread, under tread, and sidewall rubber over the plies, but including the beads.

"Circumferential" means lines or direction extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core.

"Footprint" means the contact patch are area of the tire tread with a flat surface at zero speed and under normal load and pressure.

"H type tire" means a B/W range of between 60-70%, wherein B is the width between the wheel flange, and W is the inflated tire width under rated pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint including non-contacting portions such as grooves.

"Normal inflation pressure" refers to the specific design inflation pressure and load assigned by the appropriate standards organization for the service condition for the tire.

"Section width" is the distance between a tire's sidewalls measured at the widest part of the tire when inflated to rated pressure and not under load.

"Zigzag belt reinforcing structure" means at least two layers of cords or a ribbon of parallel cords having 1 to 20 cords in each ribbon and laid up in an alternating pattern extending at an angle between 5° and 30° between lateral edges of the belt layers.

BRIEF DESCRIPTION OF THE DRAWINGS

The invention will be described by way of example and with reference to the accompanying drawings in which.

DETAILED DESCRIPTION OF THE INVENTION

Figure 1:
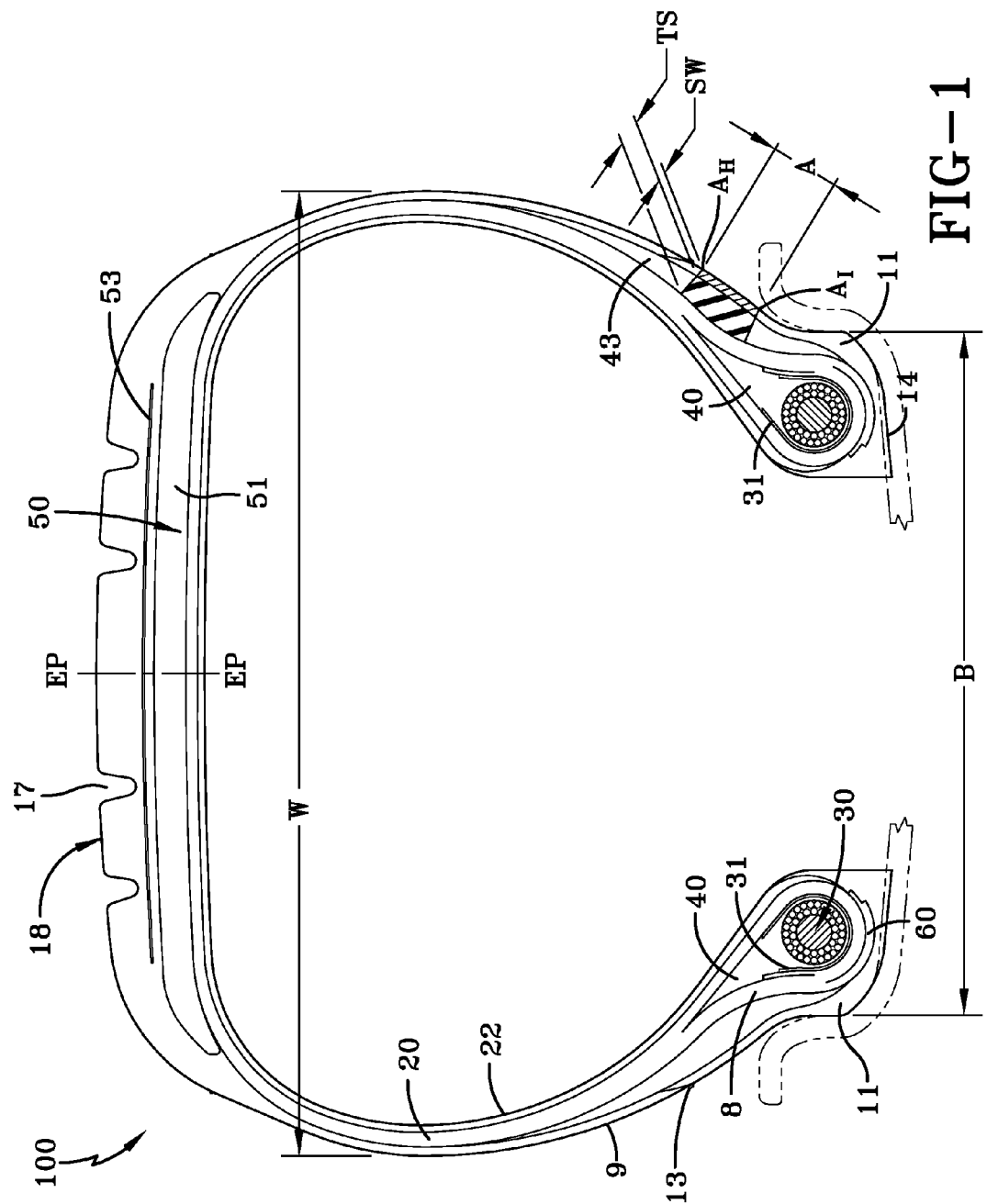
FIG. 1 is a cross-sectional view of a pneumatic radial tire employing the bead core design of the present invention.

With reference to FIG. 1, a cross-sectional view of a radial ply tire 100 is shown. The tire 100, as illustrated, is a construction for use as an aircraft tire. The tire 100 by way of example is a radial aircraft tire exposed to high internal pressures and tremendous loads. The invention is not limited to an aircraft tire, and may be used on other tires such as earthmover, commercial truck and off the road tires.

The tire 100 is a radial ply tire of the tubeless type construction. The tire 100 has an air impervious inner liner 22 which contains fluid or air under pressure. Radially outward of the inner liner 22 are one or more radial plies 20. Each ply 20 extends from an annular tensile member commonly referred to as a bead core 30. As shown the plies 20 may wrap about the bead core 30 either turning axially out and up forming a ply turnup or alternately turning axially in and under the bead core 30. The plies may be anchored to the bead utilizing other configurations known to those skilled in the art.

Each of these carcass plies 20 may comprise any suitable cord, typically nylon cords such as nylon-6,6 cords extending substantially perpendicular to an equatorial plane EP of the tire (i.e. extending in the radial direction of the tire). Preferably the nylon cords have an 1890 denier/2/2 or 1890 denier/3 construction. One or more of the carcass plies may also comprise an aramid and nylon cord structure, for example, a hybrid cord, a high energy cord or a merged cord. Examples of suitable cords are described in U.S. Pat. No. 4,893,665, U.S. Pat. No. 4,155,394 or U.S. Pat. No. 6,799,618. Preferably, the ply cords have a percent elongation at break greater than 8% and less than 30%, and more preferably greater than 9% and less than 28%.

The tire is shown mounted on a rim flange having a rim flange width extending from one bead to the other bead and indicated as B in FIG. 1. The section width of the tire is indicated in FIG. 1 as W and is the cross-sectional width of the tire at the widest part when inflated to normal pressure and not under load. The aircraft tire of the present invention preferably is an H rated tire having a ratio of B/W in the range of about 0.63 to about 0.7, and more preferably in the range of about 0.65 to about 0.68. It is additionally preferred that the ratio of the rim flange width to the maxim belt width, B/BW be in the range of about 0.84 to about 1, and more preferably in the range of about 0.86 to 0.92, and most preferably in the range of about 0.88 to about 0.9.

Radially above the bead core 30 is a first rubber apex 40. The first rubber apex is preferably triangular in shape, and preferably does not extend past the point $A_H$, which is explained in more detail, below. A flipper 31 is wrapped around the first apex and bead core, and has ends radially inward of the apex 40. Preferably radially below the plies 20 is a chafer 11, which extends from a position radially inward of the bead to the bead toe, and then to the bead heel, to a position radially outward of the bead, terminating in a point $C_H$ 13. It is preferred that the chafer 11 extend radially outward so that the end $C_H$ 13 is radially outward of $A_H$. A is the contact area of the tire with the wheel flange under loaded condition, and has a lower point $A_I$ defined by the contact edge at inflated, but unloaded condition and an upper limit $A_H$ at inflated conditions under 200% rated load.

Axially outward of the plies 20 is a second, optional apex 43 which is an elongated strip of elastomeric material extending radially outward of the bead adjacent the chafer. This apex 43 is interposed between the sidewall 9, the chafer 11 and the ply 20.

Radially outward of the carcass plies 20 is a belt package 50. A fabric layer 53 is shown radially outward of the belt package 50. Above the fabric layer 53 is a tread 18 as shown, the tread 18 has a plurality of circumferentially continuous grooves 17.

Figure 4:
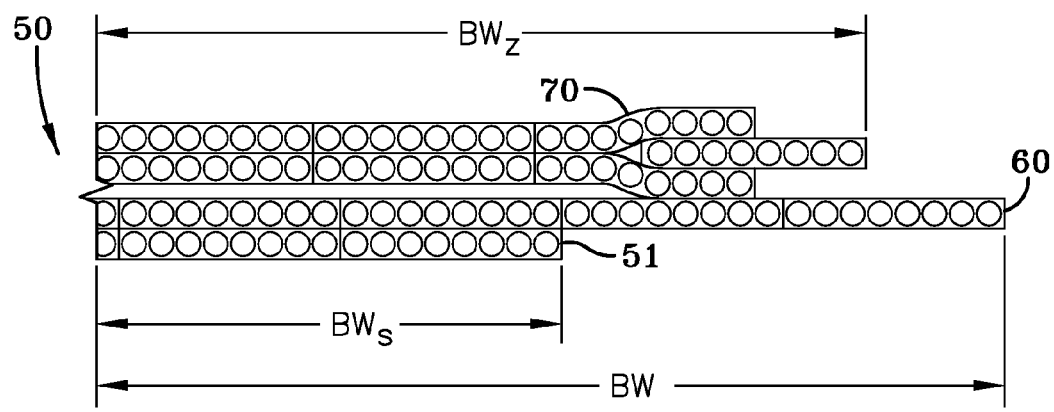
FIG. 4 is a cross-sectional view of one half of a belt package for the tire of FIG. 1.

The belt package 50 as shown in FIG. 4 comprises a first belt layer 51 located adjacent the carcass. The first belt layer 51 is preferably formed of cords having an angle of 10 degrees or less with respect to the mid-circumferential plane, and more preferably, 5 degrees or less. Preferably, the first belt layer 51 is formed of a rubberized strip of two or more cords made by spirally or helically winding the cords relative to the circumferential direction. The first belt layer 51 is the narrowest belt structure of the belt package 50, and has a width in the range of about 13% to about 100% of the rim width (width between flanges).

As shown in FIG. 4, the belt package 50 further comprises a second belt layer 60 located radially outward of the first belt layer 51. The second belt layer 60 is preferably formed of cords having an angle of 5 degrees or less with respect to the mid-circumferential plane. Preferably, the second belt layer 60 is formed of a rubberized strip of two or more cords made by spirally or helically winding the cords relative to the circumferential direction. The second belt layer has a width in the range of about 101% to about 120% of the rim width, and has a width greater than the first belt layer 51. More preferably, the second belt layer 60 is the widest belt layer of the belt package 50. It is additionally preferred that the ratio of the narrowest belt layer to the widest belt layer, BWs/BW be in the range of about 0.3 to about 0.6, and more preferably about 0.4 to about 0.5.

The belt package 50 further comprises at least one zigzag belt reinforcing structure 70. The zigzag belt reinforcing structure 70 is comprised of two layers of cord interwoven together, wherein each layer of cord is inclined generally in the circumferential direction while being inclined to extend between alternating lateral belt edges. The strip is wound along such zigzag path many times while the strip is shifted a desired amount in the circumferential direction so as not to form a gap between the adjoining strips 43. As a result, the cords extend in the circumferential direction while changing the bending direction at a turnaround point at both ends 44, 45. The cords of the zigzag belt structure cross with each other, typically at a cord angle of 5 degrees to 30 degrees with respect to the equatorial plane EP of the tire when the strip 43 is reciprocated at least once between both side ends 44 and 45 of the ply within every 360 degrees of the circumference as mentioned above. The two layers of cords formed in each zigzag belt structure are embedded and inseparable in the belt layer and wherein there are no cut ends at the outer lateral ends of the belt.

It is preferred that the zigzag belt structure 70 is the most radially outward belt structure of the belt package 50. It is additionally preferred that there is only one zigzag belt structure. The zigzag belt structure 70 is preferably wider than the first belt structure 51, and more preferably is wider than both the first belt structure 51 but has a width less than the second belt structure 60. The ratio of the zigzag belt width Wz to the second belt structure width Ws is preferably as follows:

$$0.6 < BWz/BWs < 1.0 \qquad (1)$$

The cords of any of the above described spiral or zigzag belt layers may be nylon, nylon 6,6, aramid, or combinations thereof, including merged, hybrid, high energy constructions known to those skilled in the art. One example of a suitable cord construction for the belt cords, carcass cords (or both), may comprise a composite of aramid and nylon, containing two cords of a polyamide (aramid) with construction of 3300 dtex with a 6.7 twist, and one nylon or nylon 6/6 cord having a construction of 1880 dtex, with a 4.5 twist. The overall merged cable twist is 6.7. Preferably, the belt cords have an elongation at break greater than about 8% and less than about 26% and a break strength greater than about 400N. More preferably, the belt cords have an elongation at break in the range of about 9% to about 25%. It is additionally preferred that the ply cords have a greater elongation at break than the belt cords elongation at break. The cord properties such as percent elongation at break, linear density and tensile strength are determined from cord samples taken after being dipped but prior to vulcanization of the tire.

Figure 2:
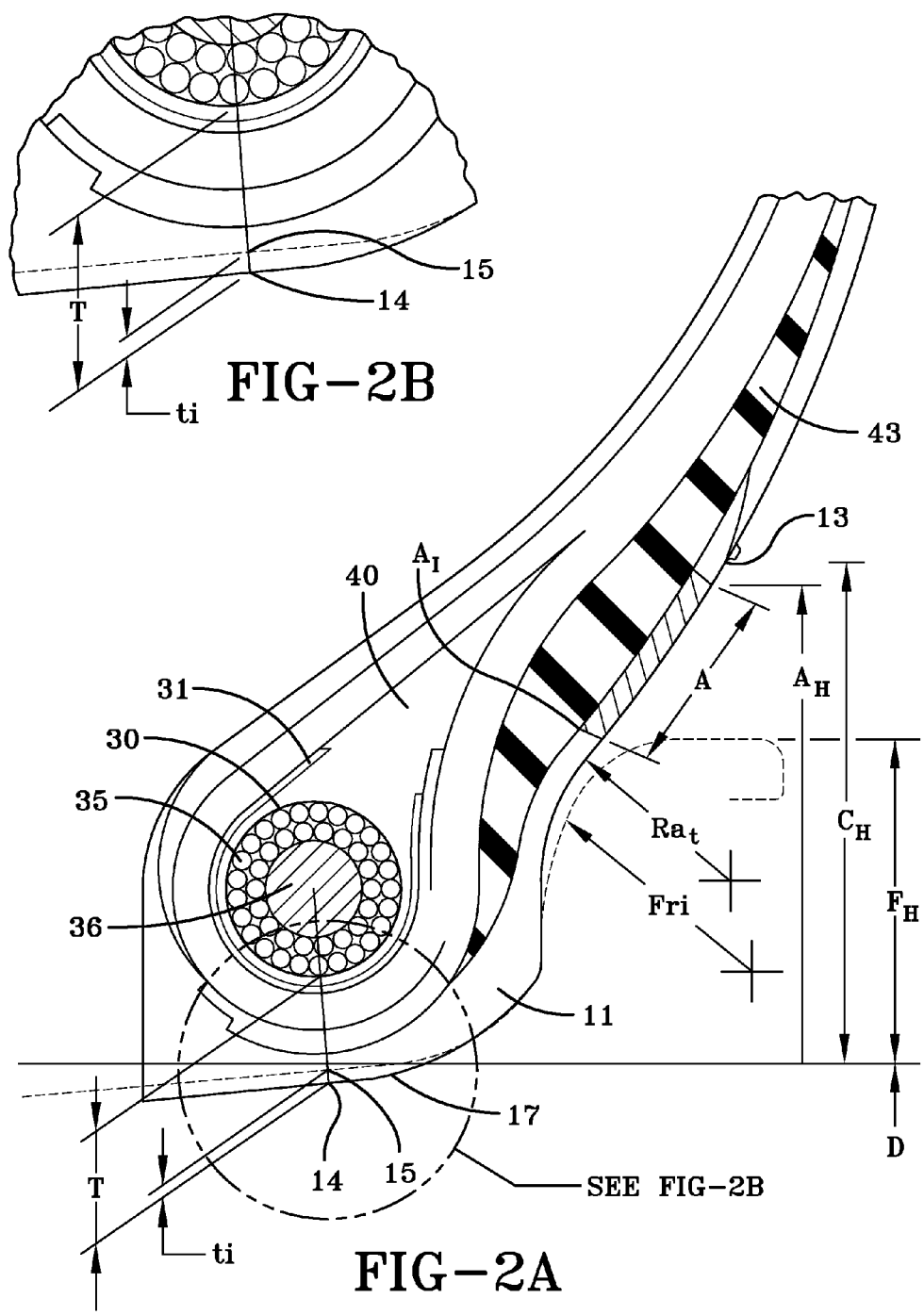
FIG. 2 is a cross-sectional view of the bead portion of the tire of FIG. 1.

The tire structure 100 as mentioned is an example of one type of tire structures that can utilize the bead core 30, of the present invention. Although the tire 100 as shown is an aircraft tire structure, the invention is also usable in other tires such as for example, truck tires, off the road tires, or highly loaded heavy-duty tires. With reference to FIG. 2, the bead core 30 of the present invention is shown. As illustrated the central core 36 is shown as a single wire or rod 35 wound at 360°. The ends of the wire 35 are preferably welded to form one continuous hoop or central core 36. The central core 36 is made of an alloy of aluminum, or other lightweight metal alloy such as magnesium, titanium, or any metal alloy having a weight less than steel.

Aluminum is an ideal alloy in that it provides excellent corrosion resistance when used with steel and it is very strong at the welded joint. Aluminum can be tempered, further increasing the tensile strength of the central core 36. The tensile strength of 6061 aluminum alloys can vary in the range of 125 MPa for 6061 $T_0$ to 310 MPa for 6061 $T_6$. Aluminum alloys in 6061 $T_4$ range have superb strength ratios while maintaining excellent ductility.

As further illustrated the central core 36 is wrapped by a sheath of two or more sheath layers 35, preferably at least two sheath layers 35. The wires 35 of the sheath layers are steel helically or spirally wound about the central core 33. The invention is not limited to the bead core illustrated, and other bead designs may be utilized.

The bead area design of the present invention reduces the problem of bead cracking and deformation by reducing the tire wheel contact pressure and reducing the heat generation. As best shown in FIG. 2, the tire has a radius Ra. Ra is measured on an unused or new tire, and before mounting on the rim. The centerpoint of the radius Ra is located outside of the tire, resulting in a concave curvature on the rim contact portion of the tire. If the flange selected for use has an elliptical shape with the maximum radius $F_{R1}$, then Ra should range in value from 0.6 to 2.1 times $F_{r1}$, and more preferably from about 1.3 to about 2.1 times $F_{r1}$. This results in reduced heat generation caused by the bead rubbing against the flange.

The bead of the present invention is designed to have a bead compression ratio of less than about 24%, and more preferably less than about 18%. The bead compression ratio can be defined by t1/T, wherein: t1 is the interference gauge of chafer rubber between the rim and the tire, as measured under the center of the bead core perpendicular to tire bead seat surface 14. t1 can be calculated by subtracting the bead seat radius from the rim flange radius. T is the total material gauge under the bead core as measured in a radial direction along the bead core centerline, from the radially innermost edge 15 of the bead core 30 to the radially innermost edge of the bead area 14.

Therefore, $$\frac{t1}{T} \leq .24;$$

and more preferably, $$\frac{t1}{T} \leq .18$$

In order to improve the bead durability, another important parameter is defined by the following relationship:

$$\frac{SW}{TS} = 0.1 \sim 0.5$$

Wherein: SW is the gauge thickness of the sidewall at point $A_H$; A is the contact area of the tire with the wheel flange, and has a lower point A1 defined by the contact edge at inflated, but unloaded condition and an upper limit $A_H$ at inflated conditions, and loaded under 200% rated load; TS is the total rubber gauge of the sidewall and other rubber components such as the apex, which is axially outward of the ply, as measured at the point $A_H$.

Table I, below, lists tabulated values and results for example tires 1 through 6. All of the tires were the following size: H37.5×12.0R19 20PR mounted on wheel size: H37.5×12.0R19 with an elliptical flange shape and width between the wheel flange is 7.75". The parameters Ra, Fr1, T, t1, TS, Sw were determined. All of the tires in Table I were subjected to a taxing distance index, which was measured on each tire tested on a dynamic tire tester, at a rated load of 25,600 lbs at a rated pressure of 212 psi, at a test speed at 40 mph under a test load at 41000 lbs. The tire was run continuously at the test conditions until the tire blew out.

Each tire construction of Table 1 was subjected to a FAA TSO test. After the test, the chafing index was determined for each tire by visual inspection and measurement of the width, depth and length of cracking in the bead area. The bead deformation under the bead core at the bead seat was also measured by measuring the depth gauge of the deformation. For all three indexes, the higher the numerical value, the better the performance. Thus the best performing tire for all three indexes were examples 5 and 6 of the present invention.

TABLE I

|  | Example 1 | Example 2 | Example 3 | Example 4 | Example 5 | Example 6 |
| --- | --- | --- | --- | --- | --- | --- |
| Ra (mm) | 71 | 50 | 19.8 | 10 | 19.8 | 19.8 |
| Max. Fr1 (mm) (ellipse radius) | 19.7 | 19.7 | 19.7 | 19.7 | 19.7 | 19.7 |
| T (mm) | 13.1 | 13.6 | 11.4 | 11.4 | 11.4 | 11.4 |
| t1 (mm) | 3.8 | 4.3 | 1.8 | 1.8 | 1.3 | 1.3 |
| TS (mm) | 8 | 8.5 | 16 | 16 | 11 | 11 |
| SW (mm) | 6 | 6 | 3 | 5 | 3 | 3 |
| $C_H$-$A_H$ (mm) | 3.5 | 6.5 | −16.5 | 3.5 | 3.5 | 3.5 |
| Ra/Fr1 | 3.60 | 2.54 | 1.01 | 0.51 | 1.01 | 1.01 |
| BCP(t1/T) | 0.29 | 0.32 | 0.16 | 0.16 | 0.11 | 0.11 |
| SW/TS | 0.75 | 0.71 | 0.19 | 0.31 | 0.27 | 0.27 |
| Taxing distance (index) | 100 | 98 | 145 | 118 | 140 | 145 |
| Bead deformation under bead core (index) | 100 | 92 | 120 | 120 | 130 | 130 |
| Chafing (index) | 100 | 100 | 83 | 97 | 120 | 120 |

Figure 3:
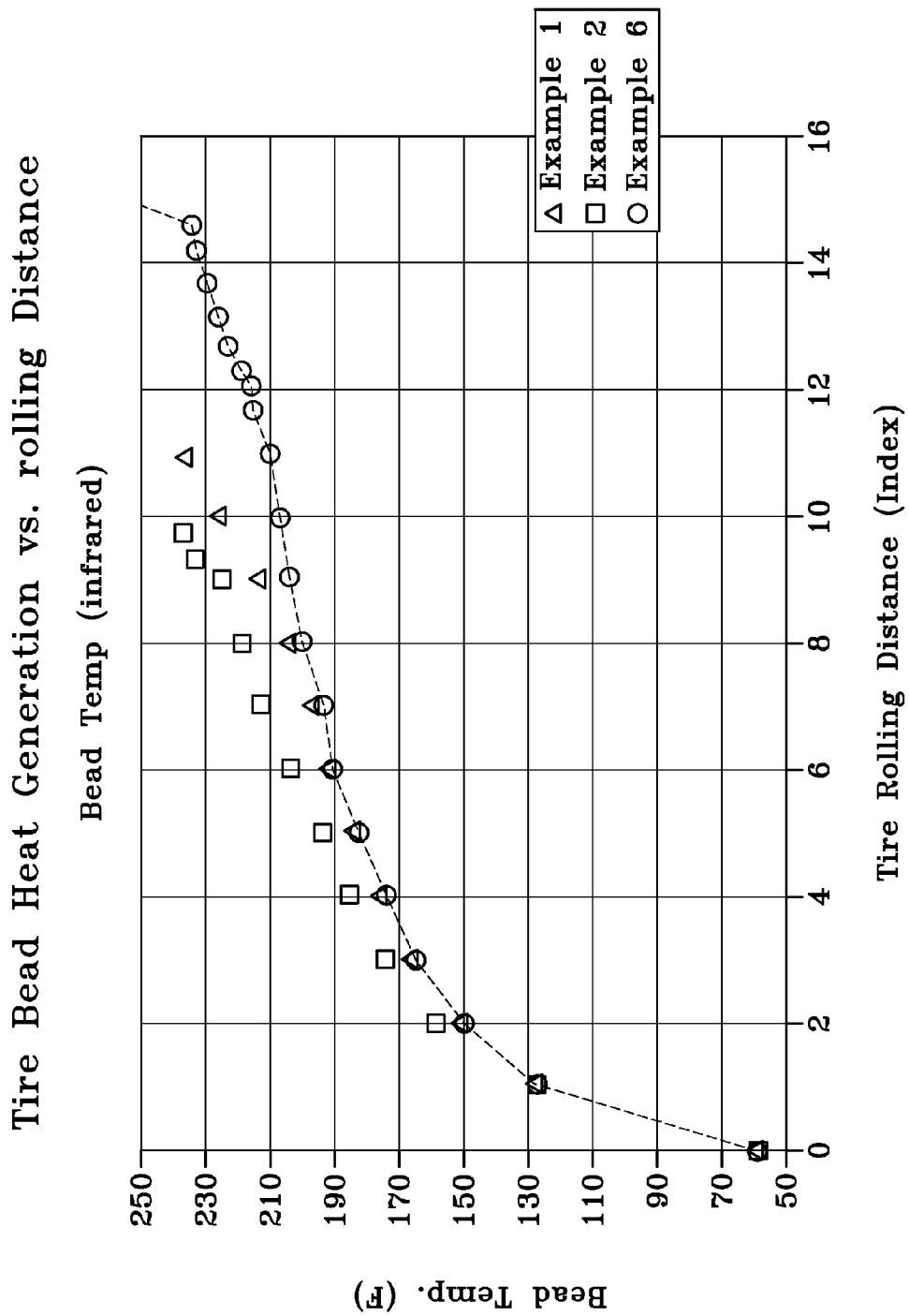
FIG. 3 is a plot of tire bead heat generation versus rolling distance for the invention.

FIG. 3 illustrates actual test data of bead temperature vs. distance (index) for the example 1 tire, the example 2 tire and the example 6 tire. As a low bead temperature was desired, the example 6 tire was the better performer.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed:

1. A pneumatic aircraft tire mounted upon a wheel having outer rim flanges, said tire having a radial carcass, a tread, a crown reinforcement comprising a first and second belt layer formed of reinforced cords oriented relative to the circumferential direction at an angle of 5° or less with respect to the equatorial plane of the tire, said crown reinforcement further comprising a zigzag belt layer located radially outward of the first and second belt layer, and having a width less than the width of the first belt layer, and having a width greater than the width of the second belt layer, and being reinforced by cords oriented relative to the circumferential direction at an angle of between 0° and 45° with respect to the equatorial plane of the tire, and the B/W ratio of the tire having a value greater than 0.6 and less than 0.7, wherein B is the width between the rim flanges, and W is the section width under rated pressure, and the B/BW ratio ranges from 0.84 to about 1, wherein BW is the maximum belt width.

2. The pneumatic tire of claim 1 having a bead core formed by a plurality of sheath wires enveloping a central core that is a light weight metal alloy material having a weight less than steel metal.

3. The pneumatic tire of claim 1 wherein at least one belt ply layer has cords having a percent elongation at break less than about 30%, and a break strength greater than about 400N.

4. The pneumatic tire of claim 1 wherein one or more of the carcass plies comprise cords made of a nylon and an aramid cord structure.

5. The pneumatic tire of claim 4 wherein at least one belt ply layer has cords having a percent elongation at break less than about 26%, and a break strength greater than about 400N.

6. The pneumatic tire of claim 4 wherein the carcass ply cords have greater elongation at break than belt cords.

7. The pneumatic tire of claim 1 wherein the carcass ply cords have a greater elongation at break than the elongation at break of the belt cords.

8. The pneumatic tire of claim 1 wherein the ratio of the width of between wheel flange B to the widest belt width BW, B/BW is in the range of about 0.88 to about 1.0.

9. The pneumatic tire of claim 1, the tire bead portion having a Ra/Fr1 relationship which ranges from about 0.6 to about 2.1, wherein: Ra is the tire bead portion radius at uninflated and in an new or unused condition, and the centerpoint of the radius Ra is located outside of the tire, and Fr1 is the wheel flange maximum elliptical radius.

10. The pneumatic tire of claim 1, wherein the bead compression ratio t1/T of the material under the bead core on the wheel in a new or un-used condition is less than 24%, wherein t1 is the interference gauge of the rubber under the bead core, and T is the total material gauge radially inward or under the bead core.

11. The pneumatic tire of claim 10 wherein the bead compression ratio t1/T is less than 18%.

12. The pneumatic tire of claim 1, wherein the chafer ending is radially outward of $A_H$, wherein $A_H$ is defined by the tire wheel flange point of contact when the tire is at inflated, and at 200% rated load.

13. The pneumatic tire of claim 12, wherein SW/TS ranges from about 0.1 to about 0.5, wherein SW is the chafer gauge at area A, TS is the total sidewall rubber gauge at area $A_H$, wherein A is defined as the region in the sidewall that has a lower radial endpoint defined by the point of contact between the flange and the tire at inflated, unloaded condition, and an upper radial endpoint defined by the tire wheel flange point of contact when the tire is at inflated, and at 200% rated load.

14. The pneumatic tire of claim 12, wherein the chafer is made of rubber having a 300% modulus (M300) range of about 5 to about 15 mpa.

* * * * *